United States Patent [19]

Greenwald

[11] Patent Number: 5,653,153
[45] Date of Patent: Aug. 5, 1997

[54] ON-VEHICLE BRAKE LATHE AND ALIGNMENT DEVICE THEREFOR

[76] Inventor: Christopher L. Greenwald, 49 Orchard St., Delmar, N.Y. 12054

[21] Appl. No.: 599,051

[22] Filed: Feb. 9, 1996

[51] Int. Cl.$^6$ .................................. B23B 5/04; B23B 1/00
[52] U.S. Cl. ........................ 82/1.11; 82/112; 82/146
[58] Field of Search ........................ 22/112, 146, 165, 22/168, 169

[56] References Cited

U.S. PATENT DOCUMENTS

| | | | |
|---|---|---|---|
| 1,733,578 | 10/1929 | Burice | 82/112 |
| 1,904,152 | 4/1933 | Lovely | 82/169 |
| 2,546,225 | 3/1951 | Julian et al. | |
| 3,691,880 | 9/1972 | Rattezee et al. | 82/112 |
| 4,266,146 | 5/1981 | Ekman | |
| 4,388,846 | 6/1983 | Kopecko et al. | |
| 4,452,111 | 6/1984 | Anderson | |
| 4,478,116 | 10/1984 | Fuller | |
| 4,493,231 | 1/1985 | Wossner | |
| 4,523,499 | 6/1985 | Aldridge et al. | |
| 4,854,199 | 8/1989 | Norman | |
| 5,099,728 | 3/1992 | Thiem | |
| 5,279,192 | 1/1994 | Hartman | 82/112 |

*Primary Examiner*—Daniel W. Howell
*Assistant Examiner*—Kenneth J. Hansen
*Attorney, Agent, or Firm*—Schmeiser, Olsen & Watts

[57] ABSTRACT

An alignment device to be mounted on an on-vehicle brake lathe to provide quick and easy lateral run out compensation. A concentric bottom plate, ring member and top plate are mounted onto the output shaft of the lathe prior to attaching the lathe to an adapter mounted on a vehicle hub/brake assembly. Two spring-loaded screws extend through the bottom plate, ring member and top plate and into complementary recesses in the mounting face of the lathe. The ring member includes an adjustment screw which, when engaged, and in combination with the tension on the center shaft of the lathe output shaft, will alter the planar alignment of the top plate and thus compensate for the lateral run out of the hub/brake assembly and allow for the precision machining of the brake rotor surface with the cutting tips of the lathe.

2 Claims, 4 Drawing Sheets

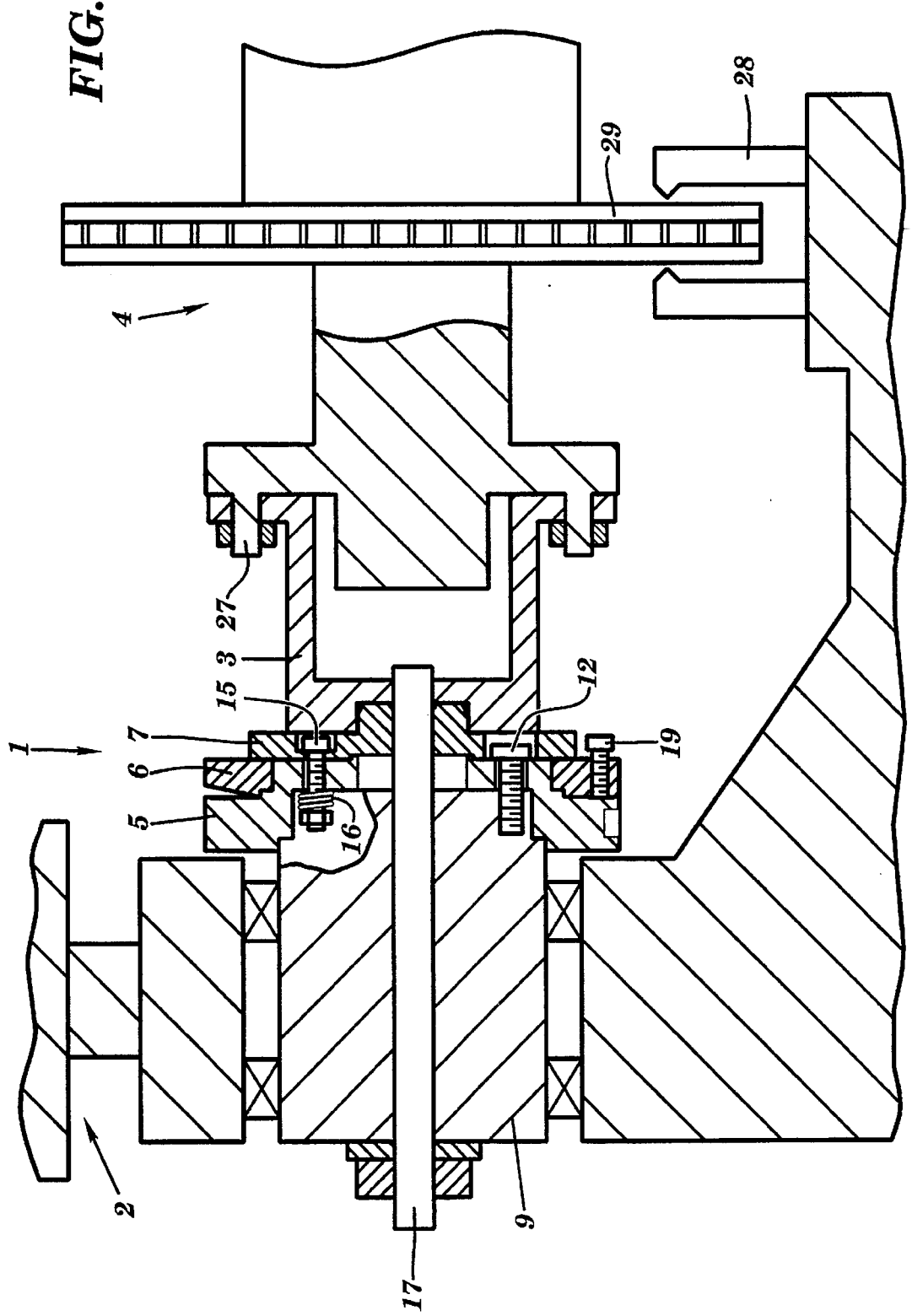

ON-VEHICLE BRAKE LATHE AND ALIGNMENT DEVICE THEREFOR

FIELD OF THE INVENTION

This invention relates generally to brake lathe machines. In particular, the present invention is concerned with an on-vehicle brake lathe alignment device to be used with a brake lathe machine.

BACKGROUND OF THE INVENTION

Many passenger vehicles and light trucks are equipped with disc brakes and over time the surface of the brakes' rotors (where the brake pads engage the disc) will wear and decrease their effectiveness. Replacing the worn brakes/ rotors is costly and time consuming. A cost effective alternative is to resurface the existing brake rotors. The brake lathe is designed to be attached to the lug bolts of a hub assembly of a passenger car or light truck that is equipped with disc brakes. The lathe includes cutting tips which are then capable of resurfacing the brake rotors while they are still attached to the vehicle.

Vehicle manufacturers require that certain standards be maintained on any resurfaced brake rotor. These standards regulate taper, parallelism, lateral run out (LRO) and rotor thickness. LRO is the total normal deviation from the theoretical plane which lies normal to the axis of rotation, as measured at a fixed radial position through one revolution of the surface. LRO is most commonly measured with a dial indicator. The indicator is placed at the outermost radius of the rotor face while the rotor is assembled on the vehicle. The hub/rotor assembly is then rotated and readings made on the indicator. LRO is the total displacement between the high and low readings.

Because of inaccuracies inherent to the hub assembly and the lathe mounting procedure, the central axis of the lathe is very rarely perfectly aligned with the hub's axis of rotation. Any angular misalignment between lathe and hub will cause the lathe cutting tips to move in a lateral motion while the lathe is in operation. This lateral motion can best be described as a sinusoidal movement of the cutting tips towards and away from the vehicle. Barring vehicle or lathe damage, this sinusoidal motion occurs with a period equal to one revolution of the hub/disc/lathe driveshaft assembly. Because the period is constant, this sinusoidal motion can be completely described by two factors: amplitude and phase. To compensate for the initial angular misalignment, and thus the LRO of the tips, an angular adjustment must be made. This adjustment must be equal in magnitude to the initial angular misalignment but it must be 180 degrees out of phase with the misalignment in order to bring the two axis into alignment. When the two axis are thus aligned, the LRO of the cutting tips has been minimized. Adjusting for this angular misalignment is known as LRO compensation.

Presently, LRO is compensated for with a system that requires the adjustment of three or more individual screws, which depending on the specific lathe/adapter combination being used, can be located at any point in the lathe/adapter/ hub interface. To use this system, the lathe operator will first remove the wheel from the vehicle and then place an adapter over the lug bolts of the hub/brake assembly. Although there are various adapters for use with different vehicles, each adapter has a common face. The face of the adapter complements the geometry of the mounting face of the lathe's driveshaft. The center shaft of the lathe driveshaft is then screwed into the center of the adapter, bringing the lathe mounting face tightly against the adapter face. The indicator on the lathe is then employed to identify the degree of LRO that must be compensated for. The operator will then engage a combination of the adjustment screws to bring the central axis of the lathe into alignment with the hub's axis of rotation, thus compensating for LRO. There is no efficient way for the operator to pre-determine what combination of the adjustment screws will be necessary, and consequently, a great deal of time is spent engaging one, then another, then backing off on the previous one and so on, in an attempt to find the proper combination to overcome the LRO. This adjustment procedure is time consuming, especially tricky to train and ultimately requires an acquired "knack" to be performed efficiently.

Therefore, there exists a need for an easy to use, efficient and economical alignment device to be used with an on-vehicle disc brake lathe machine.

SUMMARY OF THE INVENTION

It is an advantage of the present invention to provide a universal alignment device for use with a brake lathe machine.

Another advantage of the present invention is to provide an alignment device for a brake lathe machine that can be used quickly and easily to overcome the angular misalignment between the lathe and the hub/brake assembly of a vehicle.

It is another advantage to provide an alignment device for a brake lathe machine that has a limited number of components and requires little maintenance and upkeep.

Another advantage of the present invention is to provide an integral on-vehicle brake lathe/alignment device assembly.

BRIEF DESCRIPTION OF THE DRAWINGS

These and other advantages of the present invention will become more readily apparent upon reading the following detailed description and upon reference to the drawings in which:

FIG. 2 is a cut away along line 2—2 of FIG. 1 after each of the individual components have been attached.

DETAILED DESCRIPTION OF THE INVENTION

Figure 1:
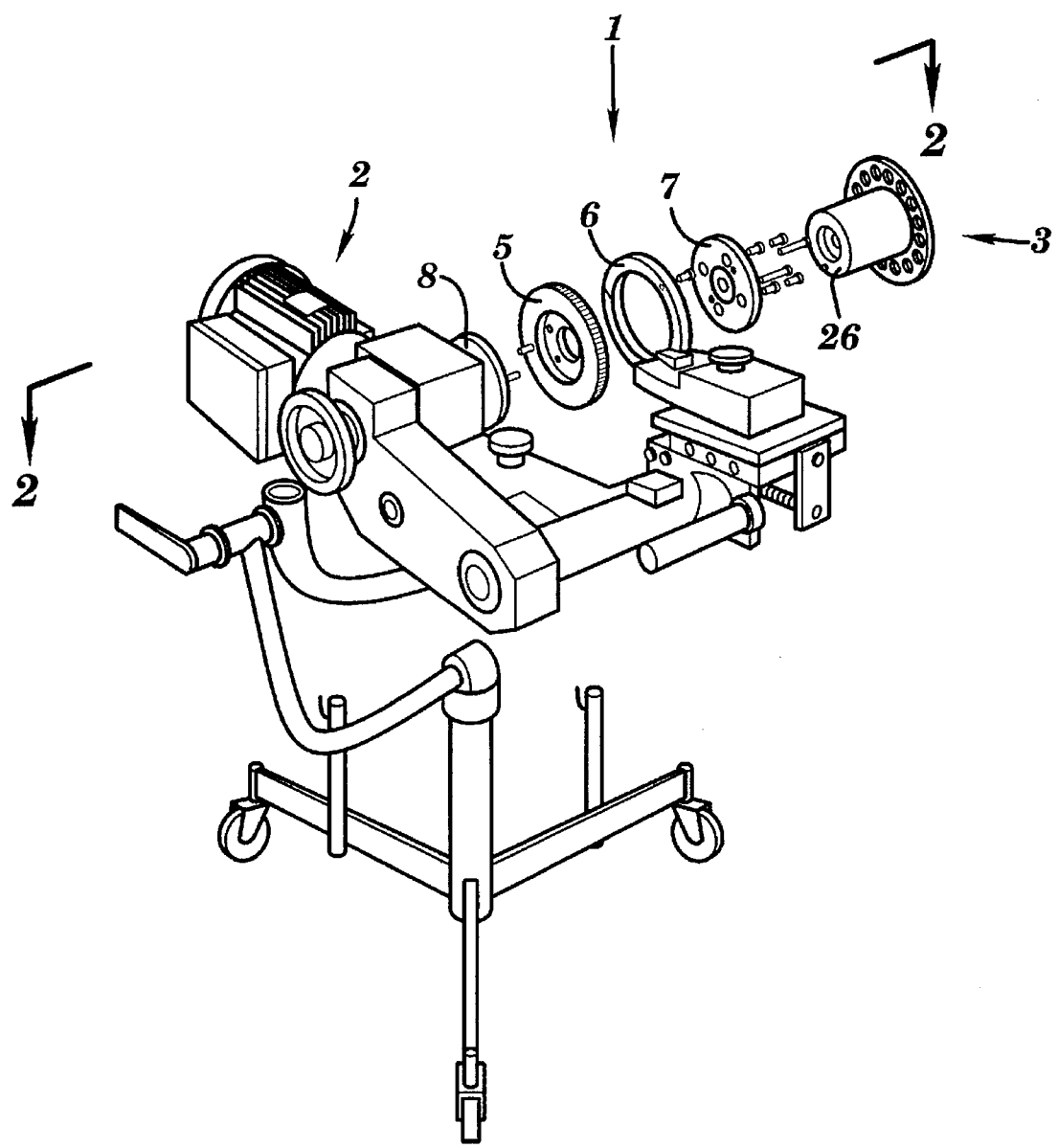
FIG. 1 is an overview of a preferred embodiment of the present invention in context with a lathe and an adapter.

Referring now specifically to the drawings, there is illustrated an alignment device, generally designated as 1, for use with a brake lathe machine, generally designated as 2, wherein like reference numerals refer to like elements throughout the drawings.

FIG. 1 shows the orientation of lathe 2, alignment device 1 and adapter 3. In practice, adapter 3 will be mounted onto the hub/brake assembly (generally designated as 4 in FIG. 2) of a vehicle. As can be further seen in FIG. 1, alignment device 1 is comprised of bottom plate 5, ring member 6, and top plate 7. Bottom plate 5 includes integrally attached rings being axially offset and having different inside and outside diameters. This geometry is similar to that of the mounting face 8 of the lathe output shaft 9. The radius of the opening of ring member 6 is such that it will fit over the extending portion of bottom plate 5 and rotate freely thereabout. Top plate 7 has a geometry which complements that of adapter 3.

Figures 3, 4:
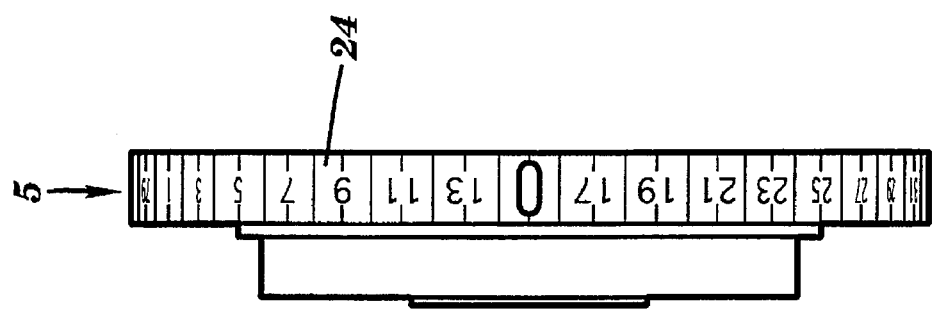
FIG. 3 is a frontal view of the bottom plate of a preferred embodiment of the present invention.
FIG. 4 is a side view of the bottom plate of a preferred embodiment of the present invention.
Figure 5:
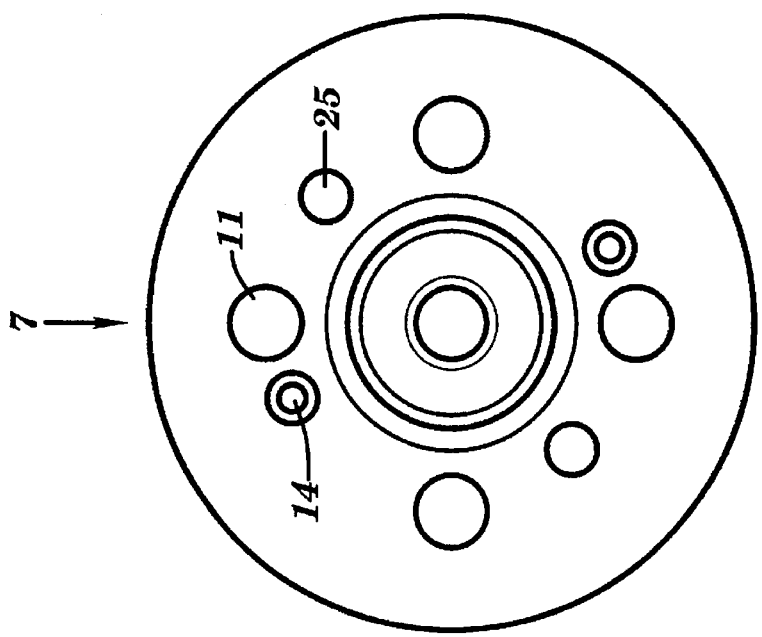
FIG. 5 is a frontal view of the top plate of a preferred embodiment of the present invention.

As shown in FIGS. 3 and 5, both bottom plate 5 and top plate 7 have a plurality of complementarily spaced apertures (4 are shown) 10 and 11. Apertures 11 on top plate 7 are of a diameter such that the head of an attachment screw 12 will pass through aperture 11 and will not secure top plate 7 to bottom plate 5. As shown in FIG. 1, an attachment screw 12 extends through each aperture 11 in top plate 7, through a corresponding aperture 10 in bottom plate 5 and finally, into a complementary aperture in the mounting face 8 of lathe output shaft 9, thus fixedly attaching bottom plate 5 to lathe output shaft mounting face 8. Other means of attachment between lathe output shaft 9 and bottom plate 5 are foreseen. These include, but are not limited to, machining the two components as an integral unit or adjoining the two with a single thread that is concentric with the axis of rotation of both parts.

Bottom plate 5 and top plate 7 further include at least two additional complementary apertures 13 and 14. Apertures 14 on top plate 7 are counterbored such that when screws 15 are inserted through the apertures 13 and 14, the screw head will be recessed flush with the front surface of top plate 7, while still securing top plate 7 to bottom plate 5. Prior to affixing bottom plate 5 to the lathe output shaft mounting face 8, by means of attachment screws 12, screws 15 are inserted through apertures 13 and 14 and a spring 16 is mounted onto the screw body followed by a screw cap nut. After alignment device 1 has been mounted onto lathe 2 by means of attachment screws 12, the spring 16 and screw cap nut will be located within complementary recesses in the mounting face 8 of lathe output shaft 9 (FIG. 2). Screws 15 function to hold top plate 7 onto the lathe/alignment device assembly prior to securing it to the adapter/hub/brake assembly.

After alignment device 1 has been mounted onto the lathe output shaft mounting face 8, a portion of the center shaft 17 extends beyond the front surface of top plate 7. The lathe/ alignment device assembly is then secured to adapter 3, which was previously mounted upon the lug bolts 27 of the vehicle's hub/brake assembly 4, and center shaft 17 extends through an aperture in adapter 3(shown in FIG. 2).

Figure 6:
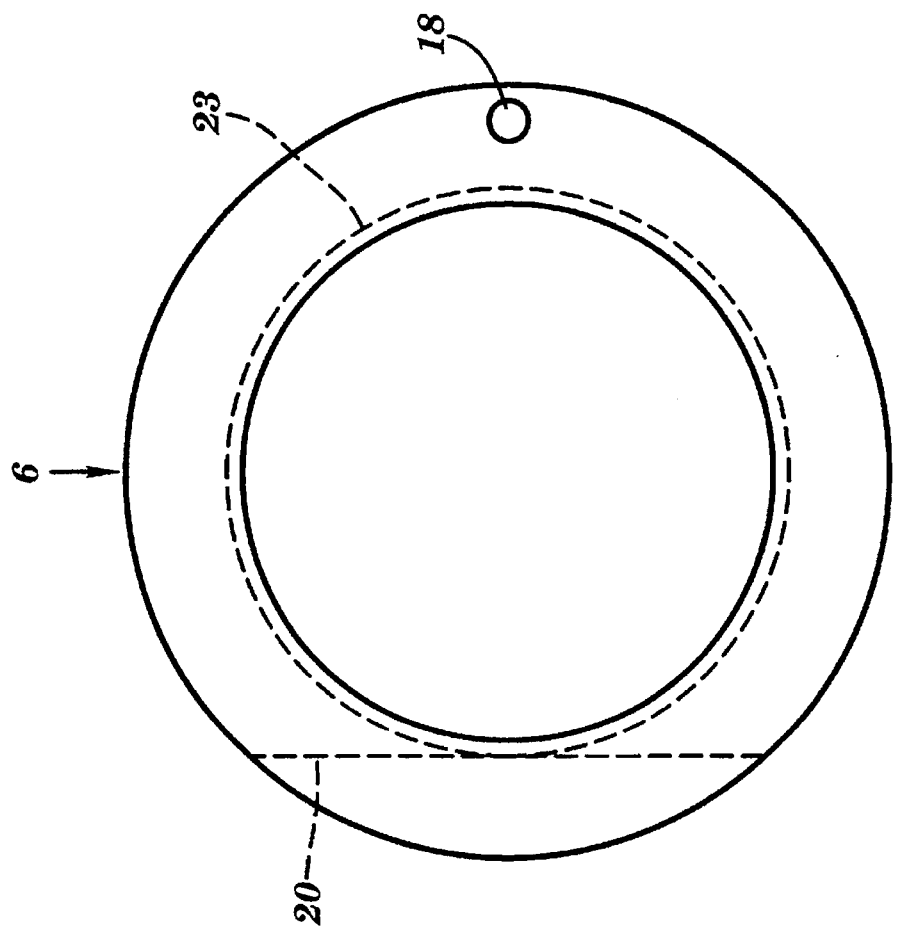
FIG. 6 is a frontal view of the ring member of a preferred embodiment of the present invention.

As is seen in FIGS. 1 and 6, ring member 6 has an aperture 18 through which adjustment screw 19 is inserted. The head of adjustment screw 19 is accessible from the front surface of ring member 6, and when engaged, the screw tip will abut the front surface of bottom plate 5. Diametrally opposed to aperture 18, the back surface of ring member 5 is cut away along a chord (shown as dashed line 20 in FIG. 6) which is normal to the diametral line including aperture 18, thus creating a "tripod-like" contact between ring member 6 and bottom plate 5 along chord 20 and adjustment screw 19 abutment. As adjustment screw 19 is tightened, bottom plate 5 will press against this contact edge, causing ring member 6 to pivot along the edge, allowing the front face of ring member 6 to press on top plate 7. Because top plate 7 is held in tension against ring member 6 after the lathe/adjustment device has been secured to adapter 3, as the planar alignment of ring member 6 is altered, the planar alignment of top plate 7 will similarly be altered as the front surface of ring member 6 presses against it. By altering this planar alignment, the LRO of the hub/lathe assembly can be compensated for.

Although the preferred embodiment has been described, it is envisioned that other alignment devices may be used in place of adjustment screw 19 such as wedges, spacers, springs or other screw arrangements. Other methods besides chordal cutaway 20 are similarly envisioned which would ensure stability between ring member 6 and bottom plate 5.

As can be seen in FIG. 2, bottom plate 5 has two alignment ridges 21 and 22 on the front surface. Ring member 6 has a groove in the back surface (shown as hidden line 23 in FIG. 6) which complements alignment ridge 21 and top plate 7 has a groove in its back surface (not shown) which complements alignment ridge 22. This system of alignment ridges and grooves assures that the three components are maintained in concentric alignment.

Referring to FIG. 4, it can be seen that bottom plate 5 has a calibrated scale 24 on its outside rim. This can be any appropriate scale. Located on the outside rim of ring member 6 is a mark (not shown) indicating the position of adjustment screw 19.

To implement alignment device 1, the components are first operatively connected by way of spring loaded screws 15 as shown in FIG. 1 (bottom plate 5, ring member 6 and top plate 7). Alignment device 1 is then mounted onto the mounting face 8 of lathe output shaft 9. The lathe/alignment device assembly is then secured to adapter 3, which was previously mounted upon a vehicle hub/brake assembly 4, by inserting center shaft 17 of the lathe output shaft through an aperture in adapter 3. It is foreseen that alignment device 1 may be used on a lathe that has been designed to operate without center shaft 17, in which case other means are envisioned to secure a lathe/modified alignment device assembly to the adapter/hub/brake assembly. As shown in FIG. 5, top plate 7 has at least one recess 25 (two are shown) which accommodates an alignment pin 26 found on the face of adapter 3 (FIG. 1).

Lathe 2 is then turned on and an indicator is employed to measure the motion of lathe 2, which is then utilized to calculate the amplitude and phase of LRO in the hub/lathe assembly that must be compensated for before the lathe cutting tips 28 can be used to resurface the brake rotor 29. Ring member 6 must then be rotated into a position where the adjustment screw mark (described above, but not shown) on the outside rim comes into alignment with the required calibrated scale 24 setting, determined by the indicator calculation. Adjustment screw 19 on ring member 6 is then engaged to alter the planar alignment of top plate 7 in relation to that of bottom plate 5. Lathe 2 is then turned back on and the indictor again employed, to verify that LRO has been compensated for within industry standards. If it is determined that the hub/lathe assembly is not within specification after the first screw adjustment, the screw may be readjusted and the previous step repeated until the hub/lathe assembly has been brought within specification for LRO. With LRO thus compensated for, the lathe operator can proceed with resurfacing the brake rotor 29 by means of the cutting tips 28.

The embodiments disclosed herein have been discussed for the purpose of familiarizing the reader with the novel aspects of the invention. Although preferred embodiments of the invention have been shown, many changes, modifications and substitutions may be made by one of ordinary skill in the art without necessarily departing from the spirit and scope of the invention as described in the following claims.

I claim:

1. An on-vehicle brake lathe comprising:
   a drive;

an output shaft, operationally connected to said drive;

a cutting tool, operationally connected to said drive, for machining a surface of a vehicle brake rotor;

an adaptor for mounting to said brake rotor;

an alignment device, comprising a mounting plate having a calibrated scale thereon and a rotatable ring member having an adjustment screw extending therethrough, mounted onto said output shaft, for precision alignment between said cutting tool and said surface of a vehicle brake rotor wherein said alignment device is attachable to said adaptor.

2. A process for aligning an on-vehicle brake lathe and a vehicle hub/brake assembly, comprising the steps of:

providing an on-vehicle brake lathe having an output shaft extending therefrom;

mounting an alignment device on said output shaft, said alignment device comprising a mounting plate having a calibrated scale thereon and a rotatable ring member having an adjustment screw extending therethrough;

providing a hub/brake assembly of a vehicle;

providing an adapter and mounting said adapter onto said hub/brake assembly;

attaching said on-vehicle brake lathe and alignment device to said adapter;

providing an indicator to calculate lateral run out of the hub/brake assembly, adaptor, and lathe and alignment device;

rotating said ring member to bring said adjustment screw into alignment with a desired calibrated scale position;

engaging said adjustment screw to compensate for said calculated lateral run out of said hub a brake assembly adaptor, and lathe and alignment device.

* * * * *